Dec. 15, 1925.
E. B. CROCKER
1,565,551
RETARD GAUGE
Original Filed Sept. 16, 1920    2 Sheets-Sheet 1
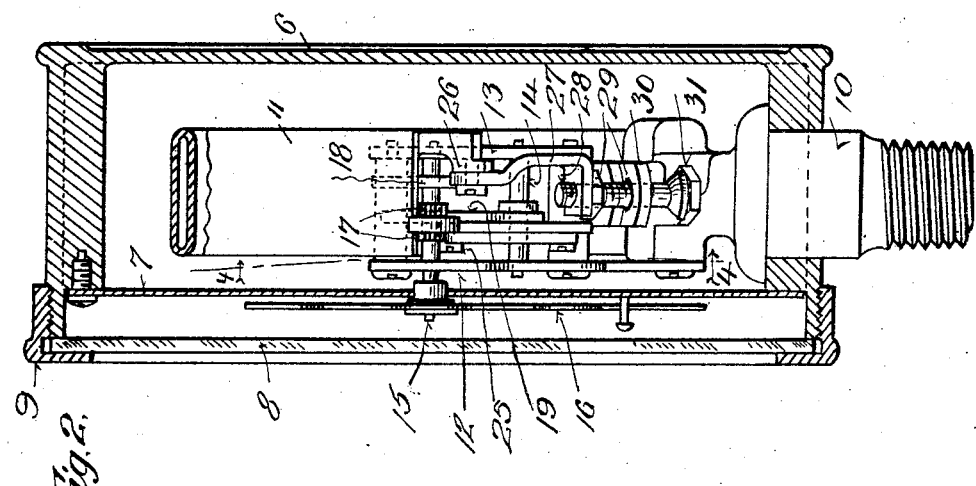
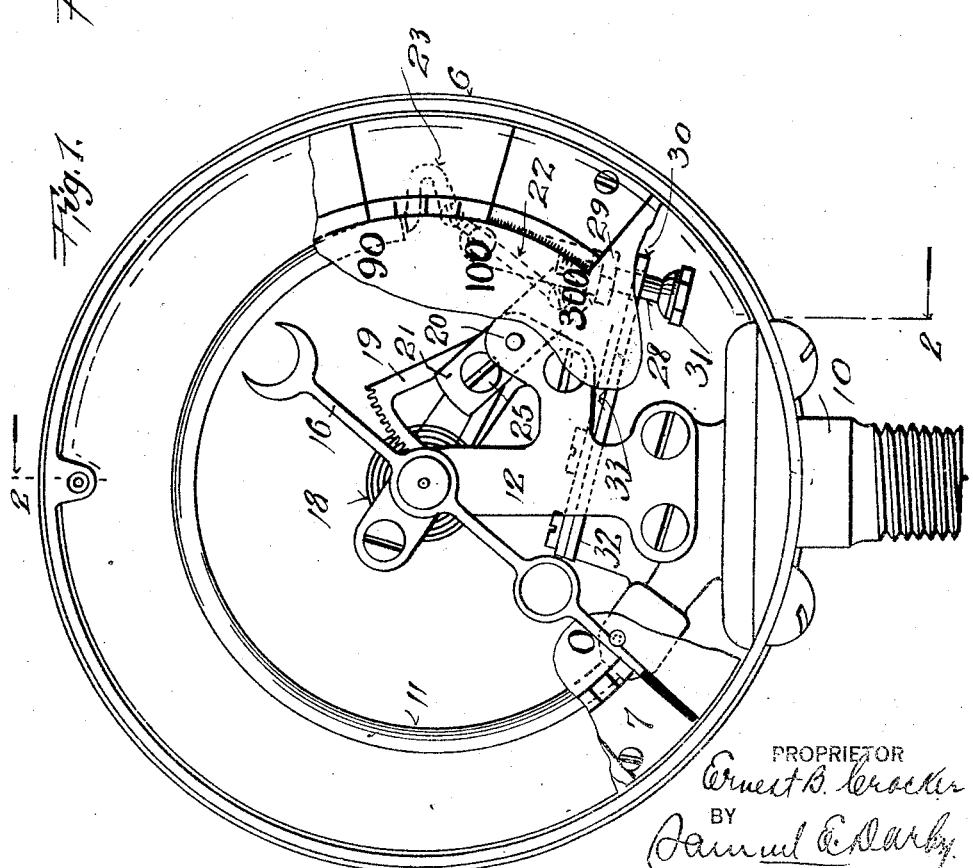
PROPRIETOR
Ernest B. Crocker
BY
Samuel E. Darby
ATTORNEY Dec. 15, 1925.
E. B. CROCKER
RETARD GAUGE
Original Filed Sept. 16, 1920    2 Sheets-Sheet 2
1,565,551
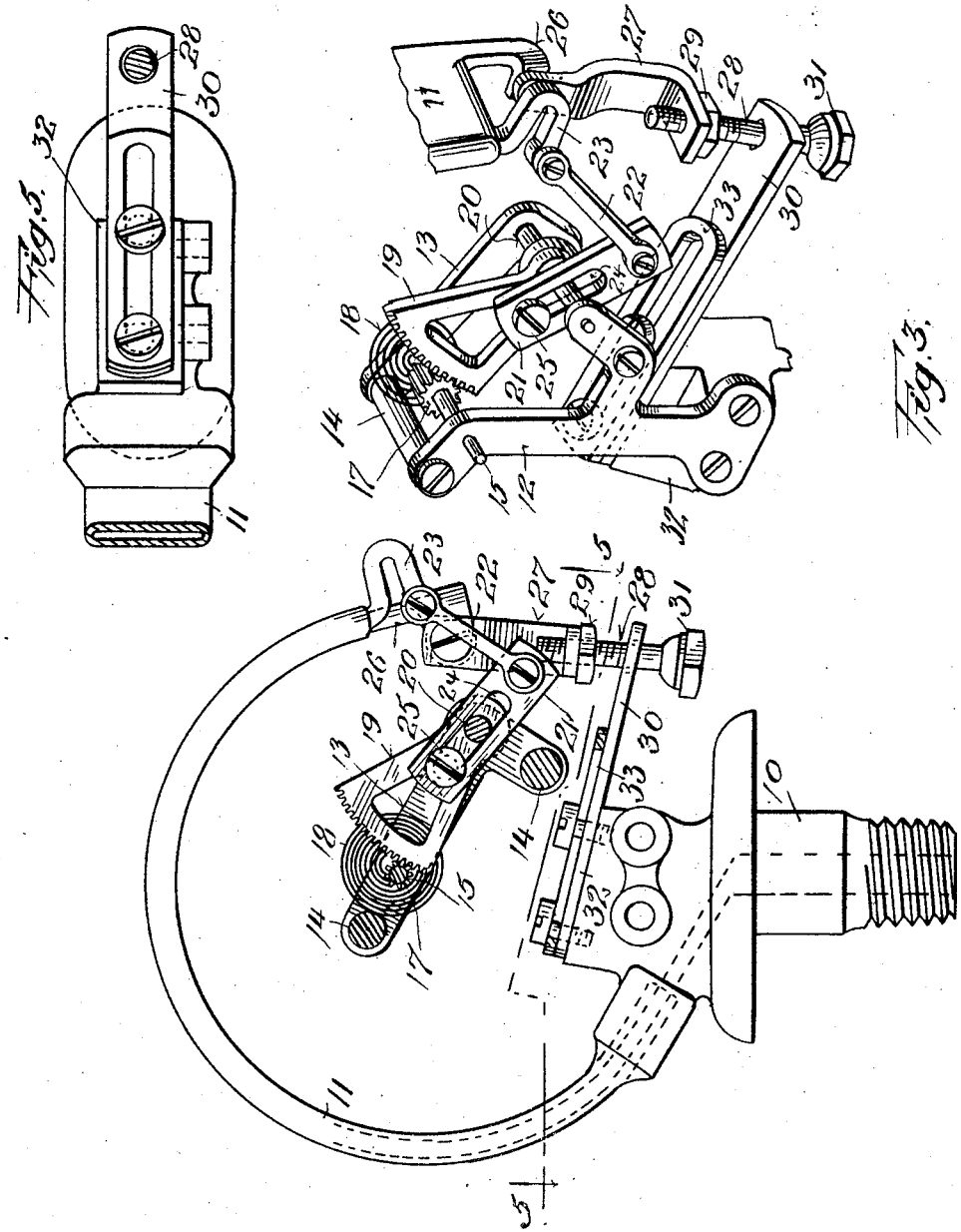
Inventor
Ernest B. Crocker
by his atty Samuel E. Darby Patented Dec. 15, 1925.

1,565,551

UNITED STATES PATENT OFFICE.

ERNEST B. CROCKER, OF STRATFORD, CONNECTICUT, ASSIGNOR TO MANNING, MAXWELL & MOORE, INC., OF NEW YORK, N. Y., A CORPORATION OF NEW JERSEY.

RETARD GAUGE.

Application filed September 16, 1920, Serial No. 410,631. Renewed May 12, 1925.

*To all whom it may concern:*

Be it known that I, ERNEST B. CROCKER, a citizen of the United States, residing at Stratford, county of Fairfield, State of Connecticut, have made a certain new and useful Invention in Retard Gauges, of which the following is a specification.

This invention relates to pressure gauges, and particularly to pressure gauges of the retard type.

The object of the invention is to provide a pressure gauge of the retard type which is simple in structure, economical to manufacture, strong, rugged and durable in use, and efficient in operation.

A further object of the invention is to provide a pressure gauge wherein provision is made for indicating pressures in the usual and ordinary manner following variations in the pressure until such pressure attains a certain pre-determined degree, and thereafter a retard action of the pressure indicating devices through pressure variations exceeding the said pre-determined degree.

A further object of the invention is to provide means in a retard gauge of the character referred to for adjusting the connections which impose the retarding action upon the pressure responsive element of the gauge and an independent adjustment of the normal action of the pressure responsive element.

A further object of the invention is to secure compactness, ruggedness, strength and efficiency in retard gauge structures.

Other objects of the invention will appear more fully hereinafter.

The invention consists substantially in the construction, arrangement, combination and location of parts, all as will be more fully hereinafter set forth, as shown in the accompanying drawings and finally pointed out in the appended claims.

Referring to the accompanying drawings:

Fig. 1 is a view in face elevation of a retard gauge structure embodying the principles of my invention, portions of the transparent cover plate and associated dial being broken out.

Fig. 2 is a view in section on the line 2—2, Fig. 1, looking in the direction of the arrows.

Fig. 3 is a broken detail view in perspective showing the connections intermediate the pressure responsive element and the spindle of the indicating hand for normal operation as well as for operation under retarding conditions.

Fig. 4 is a view in face elevation, parts in transverse section, of the parts composing what is ordinarily termed the indicating mechanism, or gauge movement.

Fig. 5 is a view in section on the line 5, 5, Fig. 4, looking in the direction of the arrows.

The same part is designated by the same reference numeral wherever it occurs throughout the several views.

In Bourdon tube and other types of gauges it is a common expedient to graduate the dial plate with equally spaced divisions, each corresponding to a given degree of pressure to be indicated thereby. It sometimes occurs that the pressure responsive element of the gauge is subjected to abnormal or suddenly imposed pressures in excess of that for which the dial is graduated, thereby tending to rupture or otherwise injure the pressure responsive element or its associated mechanism, or unduly strain the same. For example, in case of excessive or over-pressures, suddenly imposed, the danger is incurred of causing the dial hand to be thrown violently against its limit stop pin, thereby bending, twisting or otherwise injuring such hand or its actuating devices, or impairing the accuracy of the adjustments, and in the case of Bourdon tube gauges the danger is incurred of rupturing the tube or causing a more or less permanent set in the same, thereby impairing, if not destroying, it or its adjustment. Various retard devices have been proposed, the purpose of which is to impose an auxiliary or additional yielding resistance to the movement of the pressure responsive element under the influence of the pressure to which said element is subjected, and which, while permitting the normal use and operation of the instrument under normal pressure variations, takes and yieldingly absorbs abnormal movements under conditions of abnormal or suddenly applied excessive pressures, the auxiliary or additional resistance being brought into effective action only after a given pressure to which the gauge is subjected is exceeded. It is desirable to indicate the abnormal or excessive pressures, and the movements of the gauge parts under abnormal or excessive pressure conditions may be indicated by providing the dial plate with more closely spaced graduations at the required point.

The present invention relates particularly to gauges of this type, and since such retard gauges are required to meet the exigencies of excessive and suddenly applied abnormal pressures, they must be simple, compact and rugged in structure, in order to attain efficiency, so as to enable them to meet the requirements. In addition to this requirement, it is also desirable to provide means not only for adjusting the action of the pressure responsive device when operating under normal conditions of pressure, but also for adjusting such action under the abnormal conditions of excessive or suddenly imposed pressures, as well as the point at which the retarding action commences. And these various adjustments should be effected independently of each other in order to attain the best results.

It is among the special purposes of the present invention to provide a retard gauge structure which is capable of meeting the requirements and securing the advantages referred to, and others, in a most simple and effective manner.

In the accompanying drawings I have illustrated a retard gauge structure embodying the principles of my invention as applied to gauges of the Bourdon tube type, but it is to be understood that my invention in its broadest scope, and as defined in the claims, is not to be limited or restricted to this particular type.

In the drawings, reference numeral 6 designates the gauge case within which the various parts are mounted. In the illustrative embodiment shown, this case is in the form of a cup. With the cup is mounted the usual dial plate 7. The case is also provided with the usual transparent face plate or cover 8, which is retained in place over the open side or face of the case by any suitable or desired means, such as the retaining ring 9.

Extending into the case through its peripheral wall is the socket member 10, adapted for connection to the source of pressure to be indicated by the instrument.

Mounted upon and in suitable connection with the socket member 10, is the pressure responsive member 11, which, in the structure selected for illustration, is the ordinary Bourdon tube.

Mounted upon one face of the socket member 10 is a standard 12, upon which is supported a bracket 13. The standard 12 and bracket 13, and the studs 14, which connect them together, constitute a framework in which the working parts of the gauge movement are mounted. These parts in the arrangement shown, include the spindle 15, which is journaled in the framework and extends through the dial plate 7, and carries the hand or pointer 16. Upon the spindle 15, is mounted the pinion 17. The usual biasing or hair spring 18 is also associated with the spindle 15.

Meshing with the pinion 17 is the toothed sector 19, which is mounted upon a stud 20, carried by the framework. Suitably clamped to the sector 19 is the adjustable plate 21, to which one end of a link 22 is connected. The other end of this link is connected to a lug 23 on the free end of the pressure responsive element 11.

In accordance with my invention, I provide for an independent adjustment of the connections between the pressure responsive element 11, and the sector 19. This adjustment may be secured in many different ways. A simple arrangement is shown wherein the plate 21 is formed with an elongated slot 24, through which extends the fastening screw 25, by which said plate is clamped to the sector 19. By this arrangement the plate is adjustable upon the sector thereby varying the length of the lever arm through which the sector is rocked by the action of the pressure responsive element 11, when operating under normal conditions of pressure variation.

I will now describe a structure embodying my invention for applying an auxiliary yielding resistance to the action of the pressure responsive element in case an excessive, abnormal or suddenly applied pressure is imposed on the pressure responsive element 11.

To a second lug 26 on the free end of the pressure responsive element 11 is secured one end of a link 27. A stud 28 is adjustably mounted in the other end of link 27. This adjustment may be secured by threading the end of the stud 28 through a threaded opening in the free end of the link and retaining the desired adjustment of the stud by means of a set nut 29. The stud 28 works freely through an opening in a spring member 30, in the ordinary operation of the gauge under normal pressure variations. When, however, an excessive, abnormal or suddenly applied pressure is imposed on the pressure responsive element 11, the head 31 of the stud engages the spring member thereby applying an auxiliary yielding spring resistance to the action of the pressure responsive element and hence the parts are relieved of excessive strain by the retarding action of the spring member. The independent adjustment of the stud 28 secures adjustment of the point in the movement of the pressure responsive element at which the retard action commences.

To secure ruggedness of the parts through which the retard action is applied, the spring member 30 is in the form of a plate which is mounted and held in any convenient manner. A simple and effective arrangement is shown wherein the socket member 10 is formed at its upper end with a planed off seating surface 32, upon which one end of the spring plate 30 rests and is clamped. To secure a desirable adjustment of the stiffness of the spring plate 30, and hence of its flexibility, a slotted plate 33, is placed upon and clamped to the spring plate. By adjusting this clamp plate lengthwise upon the spring plate, the flexibility of the latter is adjusted.

From the foregoing description, it will be seen that I provide an exceedingly simple, compact and rugged structure, and especially is this true of the parts through which the retarding action is secured. This is an important feature of my invention, since this action is brought into operation and is required only under conditions of excessive or abnormal pressure, and hence strength and ruggedness is necessary. Moreover, I am enabled to secure a desirable range of adjustments, not only of the parts which operate under normal conditions, but also of the parts which are brought into operation under abnormal conditions, and these various adjustments, as well as the adjustment of the stiffness of the retard spring, are effected independently of each other, thereby permitting accurate calibration of the dial plate graduations, not only for the normal pressure variations, but also for the abnormal or excessive pressure variations.

It will be understood that any suitable system of graduation of the dial plate may be employed. For illustration for a gauge designed to indicate a maximum pressure of say one hundred pounds under normal conditions, the dial plate might be graduated in the normal manner for about 240° of the circle, while the next 30° of the circle will be graduated for a maximum of three hundred pounds pressure, or three times that of the normal operation of the instrument. In other words, through a range of 30° of the circle, the graduations will correspond to three times the maximum pressure for which the dial plate is graduated for normal operation throughout 240° of the circle.

Having now set forth the objects and nature of my invention, and a structure embodying the principles thereof, I wish it to be understood that many variations and changes in details would readily occur to persons skilled in the art and still fall within the spirit and scope of my invention. I do not desire, therefore, to be limited to the exact details shown and described.

But what I claim as new and useful and of my own invention, and desire to secure by Letters Patent is:

1. In a pressure gauge and in combination with a pressure responsive element and connections to effect indications of normal pressure variations, of means to impose an auxiliary yielding resistance upon the action of the pressure responsive element under conditions of abnormal or excessive pressure, means providing a screw adjustment to vary the point in the movement of the pressure responsive element at which the application of said auxiliary means is initiated, and means for adjusting said auxiliary means to vary the amount of said resistance.

2. In a pressure gauge and in combination with the pressure responsive element and connections to effect indications of normal pressure variations, of means to impose an auxiliary yielding resistance upon the action of the pressure responsive element under conditions of abnormal or excessive pressure, adjustbale means permitting the auxiliary resistance means to be adjusted to vary the point in the movement of the pressure responsive element at which the application of said auxiliary resistance is initiated and means independent of said last mentioned means permitting the degree of movement of said connections by said pressure responsive element when responding to any given variation in said pressure to be adjusted.

3. In a pressure gauge, a graduated dial, a hand or pointer cooperating therewith, a pressure responsive element, connections intermediate said element and hand or pointer to actuate the latter, and adjustable means permitting said connections to be adjusted, in combination with an auxiliary retard spring member, independent connections intermediate said pressure responsive element and said retard spring member, and adjustable means for varying the flexibility of said spring member.

4. In a pressure gauge, a graduated dial, a hand or pointer cooperating therewith, a pressure responsive element, connections intermediate said element and hand or pointer to actuate the latter, and adjustable means permitting adjustment of said connections, in combination with an auxiliary retard spring member, independent connections intermediate said pressure responsive element and said retard spring member, adjustable means for varying the flexibility of said spring member, and adjustable means permitting adjustment of said independent connections.

5. In a pressure guage, a graduated dial, a hand or pointer cooperating therewith, a pressure responsive element, connections intermediate said slement and hand or pointer to actuate the latter, in combination with means also connected to the pressure responsive element including an auxiliary retard spring member, and means to adjust the flexibility of said spring member.

6. In a pressure gauge, a graduated dial, a hand or pointer cooperating therewith, a pressure responsive element, a socket member upon which said responsive element is mounted, connections intermediate said element and hand or pointer to actuate the latter, in combination with a spring plate rigidly held at one end upon said socket member, and adjustable connections between the free end of said spring plate and the pressure responsive element.

7. In a pressure gauge, a graduated dial, a hand or pointer cooperating therewith, a pressure responsive element, connections intermediate said element and hand or pointer to actuate the latter, in combination with a spring plate rigidly held at one end, and means connected to the pressure responsive element including a headed stud loosely passing through the free end of said spring plate.

8. In a pressure gauge, a graduated dial, a hand or pointer cooperating therewith, a pressure responsive element, connections intermediate said element and hand or pointer to actuate the latter, in combination with a spring plate supported at one end, and means connected to the pressure responsive element including a headed stud loosely passing through the free end of said spring plate.

9. In a pressure gauge, a socket member, a Bourdon tube connected at one end thereto, a dial hand, connections intermediate the free end of said tube and said hand to actuate the latter, in combination with a spring plate mounted at one end upon said socket member, and means connected to the pressure responsive element including a headed stud working loosely through the free end of said spring plate.

10. In a pressure gauge, a socket member, a Bourdon tube connected at one end thereto, a dial hand, connections intermediate the free end of said tube and said hand to actuate the latter, in combination with a spring plate mounted at one end upon said socket member, and means adjustably connected to the free end of the tube including a headed stud working loosely through the free end of said spring plate.

11. In a pressure gauge, a socket member, a Bourdon tube connected at one end thereto, a dial hand, connections intermediate the free end of said tube and said hand to actuate the latter, in combination with a spring plate mounted at one end upon said socket member, a headed stud working loosely through the free end of said spring plate, and a link connected to the free end of said tube, said stud being adjustably connected to said link.

12. In a pressure gauge, a socket member, a Bourdon tube connected at one end thereto, a dial hand, connections intermediate the free end of said tube and said hand to actuate the latter, in combination with a spring plate mounted at one end upon said socket member, means connected to the free end of the tube including a headed stud working loosely through the free end of said spring plate, and a clamp plate adjustably mounted on said spring plate to vary the flexibility of the latter.

13. In a pressure gauge, a case, a socket member extending into the case, a Bourdon tube connected at one end to said socket member, a framework supported by said socket member, a spindle mounted in said framework and carrying a dial hand, a sector for actuating said spindle, said sector also mounted in said framework, and a link connecting said sector and the free end of said tube, in combination with means independently connected to the free end of the tube including a spring plate also mounted on said socket piece.

14. In a pressure gauge, a case, a socket member extending into the case, a Bourdon tube connected at one end to said socket member, a framework supported by said socket member, a spindle mounted in said framework and carrying a dial hand, a sector for actuating said spindle, said sector also mounted in said framework, and a link connecting said sector and the free end of said tube, in combination with a spring plate also mounted on said socket piece, a clamp plate adjustably mounted on said spring plate to vary the stiffness of the latter, and connections intermediate the free end of said spring plate and said tube.

15. In a pressure gauge, a case, a socket member extending into the case, a Bourdon tube connected at one end to said socket member, a framework supported by said socket member, a spindle mounted in said framework and carrying a dial hand, a sector for actuating said spindle, said sector also mounted in said framework, and a link connecting said sector and the free end of said tube, in combination with a spring plate also mounted on said socket piece, a headed stud working loosely through the free end of said spring plate, and a link connected to the free end of said tube, said stud having adjustable connection with said link.

In testimony whereof I have hereunto set my hand on this third day of September A. D., 1920.

ERNEST B. CROCKER.